Jan. 15, 1963  J. L. BOWER  3,073,998
CUTTER SIZE CORRECTION FOR MACHINE TOOL CONTROL
Filed Feb. 16, 1959  3 Sheets-Sheet 1

INVENTOR.
JOHN L. BOWER
BY
*allan Rothenberg*
ATTORNEY

INVENTOR.
JOHN L. BOWER

United States Patent Office 3,073,998
Patented Jan. 15, 1963

3,073,998
CUTTER SIZE CORRECTION FOR MACHINE
TOOL CONTROL
John L. Bower, Downey, Calif., assignor to
North American Aviation, Inc.
Filed Feb. 16, 1959, Ser. No. 793,454
7 Claims. (Cl. 318—162)

This invention relates to programmed machine tool control and more particularly to methods and apparatus for control of machine tools which may use cutting tools of selectively different sizes.

In the preparation of a program for numerical machine control, the various computations are generally prepared on the basis of a size or diameter of the cutting tool which is assumed at the time of programming. However, it frequently occurs that the assumed cutter size may not be available at the time of cutting or that cutters of other sizes may be subsequently selected for other reasons.

Accordingly, it is an object of this invention to enable the introduction of a correction for the deviation between actual and nominal cutter size.

In the programming of a machine tool control, a program device such as magnetic tape, punched tape, punched cards or the like is prepared having information recorded thereon, preferably in digital form, representing the position of the center of the cutting tool with respect to a point to be cut. This information is read from the programmer or other storage device and fed to a digital servo which is thus operated to position the cutting tool relative to the workpiece in accordance with the programmed information. In order to allow for subsequent changes of cutter size without re-programming to change the programmed position number, the present invention permits the making of a cutter size correction at the time of the actual cutting operation by enabling the operator to set in manually or otherwise a correction or offset for the cutter size actually selected. The cutter size correction information is combined with the position information read from the programmer or storage whereby the position input to the servo drive is corrected as desired to accommodate the chosen cutter size.

In accordance with the invention there is recorded in the programming device, together with the programmed position information therein, direction information in the form of numbers defining the direction cosines of the line between the programmed position of the cutting tool center and the point to be cut. In readout, both the position and direction information are obtained from the programmer. There is generated a signal indicative of the deviation of cutter size from nominal size and this signal is multiplied by the direction cosines to obtain the required offsets for the several traversed axes as required by the chosen cutter size. These offsets are utilized together with the programmed position information to effect the positioning of the selected cutter.

An object of this invention is to facilitate the use of programmed machine tool control.

A further object of the invention is to facilitate the offsetting in a predetermined direction of a programmed tool position.

Still another object of this invention is to permit the use of cutters of different sizes in a machine tool programmed according to a nominal cutter size.

These and other objects will become apparent from the following description taken in connection with the accompanying drawings, in which.

In the drawings, like reference characters refer to like parts.

Figure 1:
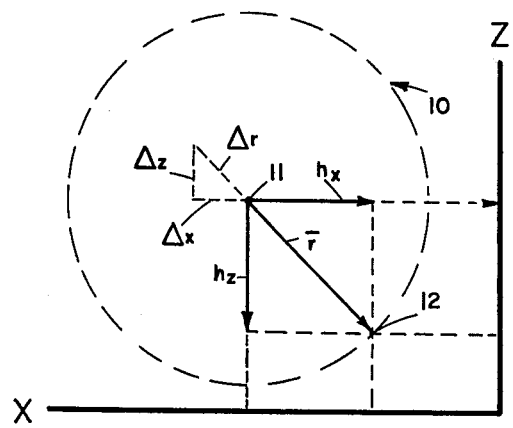
FIG. 1 illustrates the geometry of the correction which is required for variation in cutter size.

The problem of cutter size correction may be illustrated as in FIG. 1 wherein the axes X and Z are two mutually orthogonal axes of motion in which the cutting tool is to be moved relative to a workpiece in order to obtain the proper positioning for a desired cut. A cutting tool 10 having a center of rotation 11 is to cut a workpiece (not shown) at a point 12. The point 11 may be the center of the cutter in the case of a ball (spherical) end mill or the center of the end surface of the cutter in the case of a cylindrical or conical cutter. For programming of the machine there must be provided information defining the position of point 11 relative to the reference axes X and Z. This information is obtained by projecting from the point to be cut 12 a normal $\bar{r}$ having a length $r$ equal to the cutter radius (the radius at the end in the case of a cylindrical or conical cutter). The coordinates at the point 11 thus obtained then comprise the position information which is fed to the X and Z axis drives of the machine. The coordinates of $\bar{r}$ along the X and Z axes are defined as $h_X = C_X r$ and $h_Z = C_Z r$ where $C_X$ and $C_Z$ are the direction cosines of $\bar{r}$. If now the actual cutter radius selected by the operator at the time of cutting differs from the nominal value $\bar{r}$ which was used in programming by an amount $\Delta r$, the corrections, $\Delta X$ and $\Delta Z$, for the two axes are respectively $C_X \Delta r$ and $C_Z \Delta r$.

The size deviation $\Delta r$ is known or can be measured at the time of cutting and may thus be conveniently set into the control at the machine. Therefore, knowledge of the direction cosines $C_X$ and $C_Z$ will complete the information required to effect the correction computation at the machine.

While FIG. 1 illustrates the problem in connection with a two-axis machine it will be readily appreciated that the geometry and computation are substantially similar for the third axis of a three-axis machine wherein the correction $\Delta Y$ for a third orthogonal Y axis will be defined by the product $C_Y \Delta r$ where $C_Y$ is the third direction cosine of the vector $\bar{r}$ of length $r$ which is normal to the surface to be cut.

Thus, in accordance with the principles of this invention the direction cosines of the vector $\bar{r}$ are recorded in the program device together with the numbers defining the position of the nominal size cutter center. These direction cosines are read from the program device or storage and multiplied by a selected value of $\Delta r$ to obtain a cutter size correction or offset signal which is combined with the position information to drive the machine.

Figure 2:
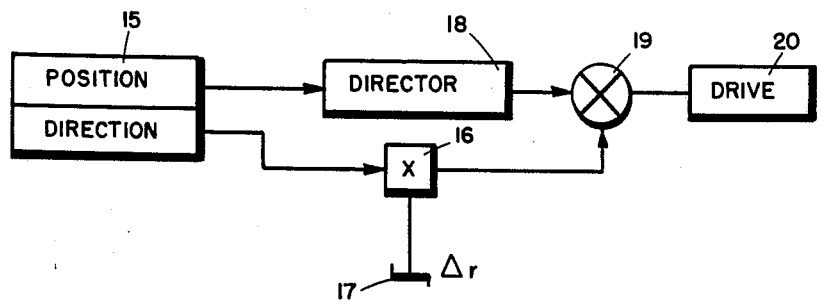
FIG. 2 is a functional diagram of one form of the invention.

As illustrated functionally in FIG. 2, storage 15 contains the position information indicating in numerical form the relative position of tool and workpiece for a particular cut and also contains for each group of position numbers the direction information defining the direction cosines of the line between the nominal cutter center and the point to be cut. The direction information obtained from the storage 15 is fed to a multiplier 16 which has a second input $\Delta r$ obtained, for example, by manual operation of a control knob 17 by the operator at the machine. The position information read from storage 15 is fed to a director 18 which has an output providing the appropriate machine drive signal as determined by the storage 15. The correction offset for cutter size at the output of multiplier 16 is combined with the output of director 18 in a summing network 19 from whence it is supplied to the machine drive 20 whereby the latter is driven in accordance with the programmed position information as appropriately modified for the selected cutter size.

Figure 3:
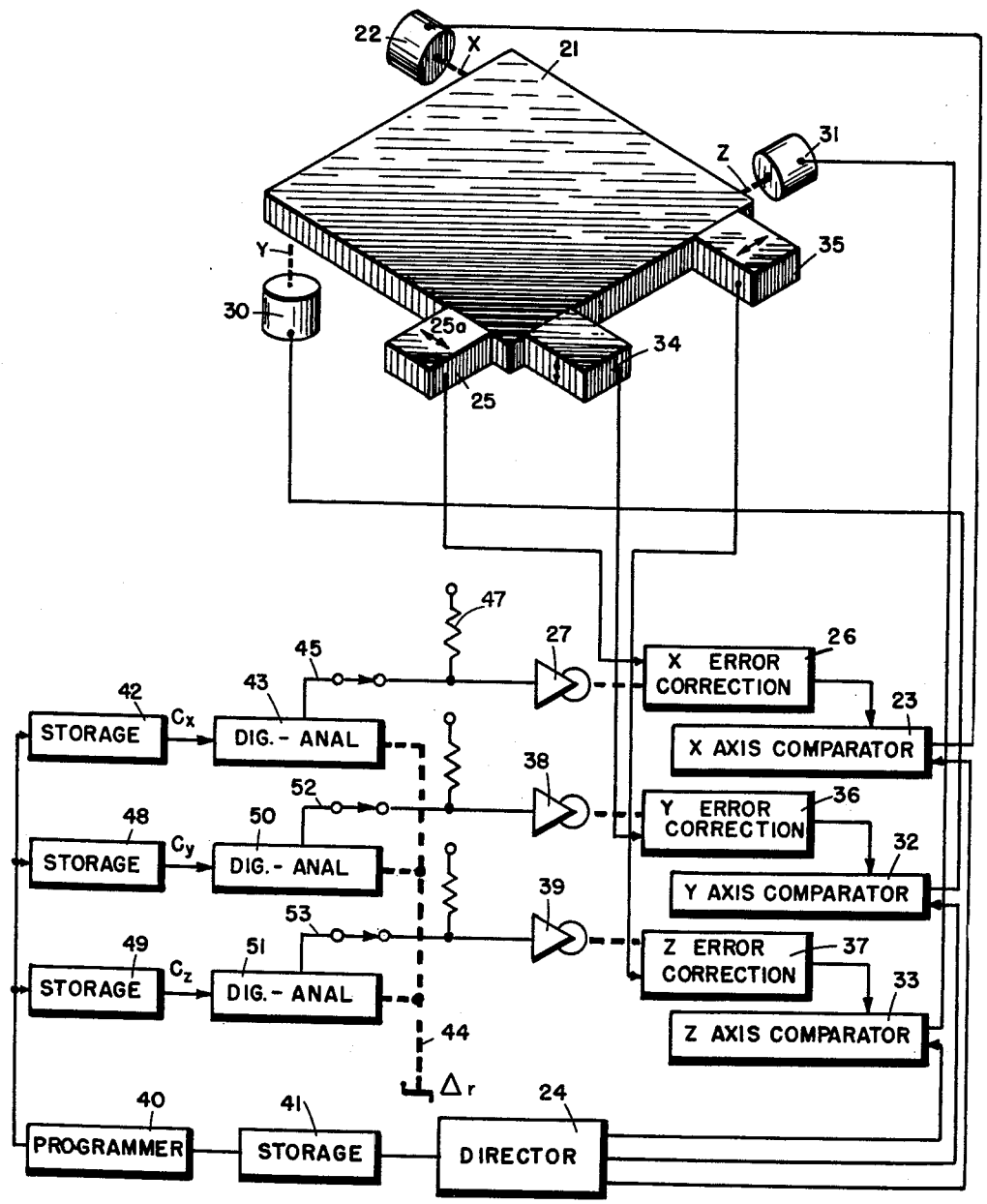
FIG. 3 is a block diagram of the invention as applied to a three-axis milling machine.

Illustrated in FIG. 3 is a block diagram of the invention as applied to a digital servo of the type more particularly described in the application Serial No. 714,716 for Error Compensated Servo, filed February 12, 1958, by John L. Bower, now Patent No. 2,988,681. A worktable 21 upon which the workpiece to be cut is securely mounted is driven relative to a cutting tool (not shown) along the X axis by a motor 22 under the control of an X axis comparator 23. The comparator 23 receives a digital command signal from director 24 and a digital X axis gage signal from a gage 25 positioned and arranged to provide an output signal in digital form indicative of the magnitude and direction of the sensed motion of the table 21 in the direction of arrow 25a. The comparator 23 provides an analog error or drive signal to the X axis motor 22 which is proportional to the difference between the signals received from gage and director.

For the purpose of adding the desired cutter size offset signal to the commanded machine position an error correction circuit 26 is interposed between the gage 25 and comparator 23. The correction circuit 26 operates to superimpose upon the gage signal a correction as determined by the shaft position of a servo 27 which has as the inputs thereto one or more of the offsets or corrections which are to be effected.

The details of the structure described so far are fully disclosed in the above-mentioned copending application of which the disclosure is incorporated herein by reference.

For positioning the table relative to the cutting tool along the axes Y and Z which are mutually orthogonal to each other and to the X axis, there are provided servo drives similar, except for orientation, to the described X axis drive. Thus the Y and X axis drives include motors 30 and 31 driven from comparators 32 and 33 having inputs from the Y axis director channel and the Y axis gage 34 and from the Z axis director channel and from the Z axis gage 35 via correction circuits 36 and 37 respectively. The correction networks 36 and 37 are driven respectively by the correction servos 38 and 39.

The programmer 40 which may be in the form of a magnetic tape and tape handling equipment or punched tape or punched cards or the like has stored therein the X, Y and Z axis position information for the various cuts to be made. For each coordinate axis of each cut the information in digital form is read from the programmer and fed to a storage device 41 which operates the director 24 to provide therefrom a number of pulses equal to the programmed position number. As the position number is read from the programmer 40 to the storage 41 the direction cosine $C_X$ for the corresponding axis of such position number is also read out into storage 42 from whence it is fed to a digital to analog converter 43. The converter 43 has an input in the form of the selected cutter size deviation $\Delta r$ which may be provided, for example, by the manual operation of a shaft 44. The signal $\Delta r$ is multiplied in the converter by the direction cosine (by adjustment of the voltage input to the converter in proportion to the error in $r$) to provide the X axis cutter size offset $\Delta X$ at the output 45 of the digital to analog converter 43. The converter output on line 45 is fed as one input to the correction circuit operating servo 27 through an input resistor 46 thereof. Other corrections may be fed to the servo 27 through other resistors such as that indicated at 47 as desired.

The cutter size offset corrections for the Y and Z axes drives are effected in a manner similar to the X axis correction by reading from the programmer 40 to the Y and Z direction storage 48 and 49 the programmed direction cosines for respective Y and Z position components of the cut which is to be made. The signals in numerical form $C_Y$ and $C_Z$ are fed to digital-analog converting networks 50 and 51 which also receive the signal $\Delta r$ from the shaft 44 to provide at the outputs 52 and 53 thereof the Y and Z cutter size offsets $\Delta Y$ and $\Delta Z$ which are respectively fed to the correction circuit operating servos 38 and 39.

Figure 4:
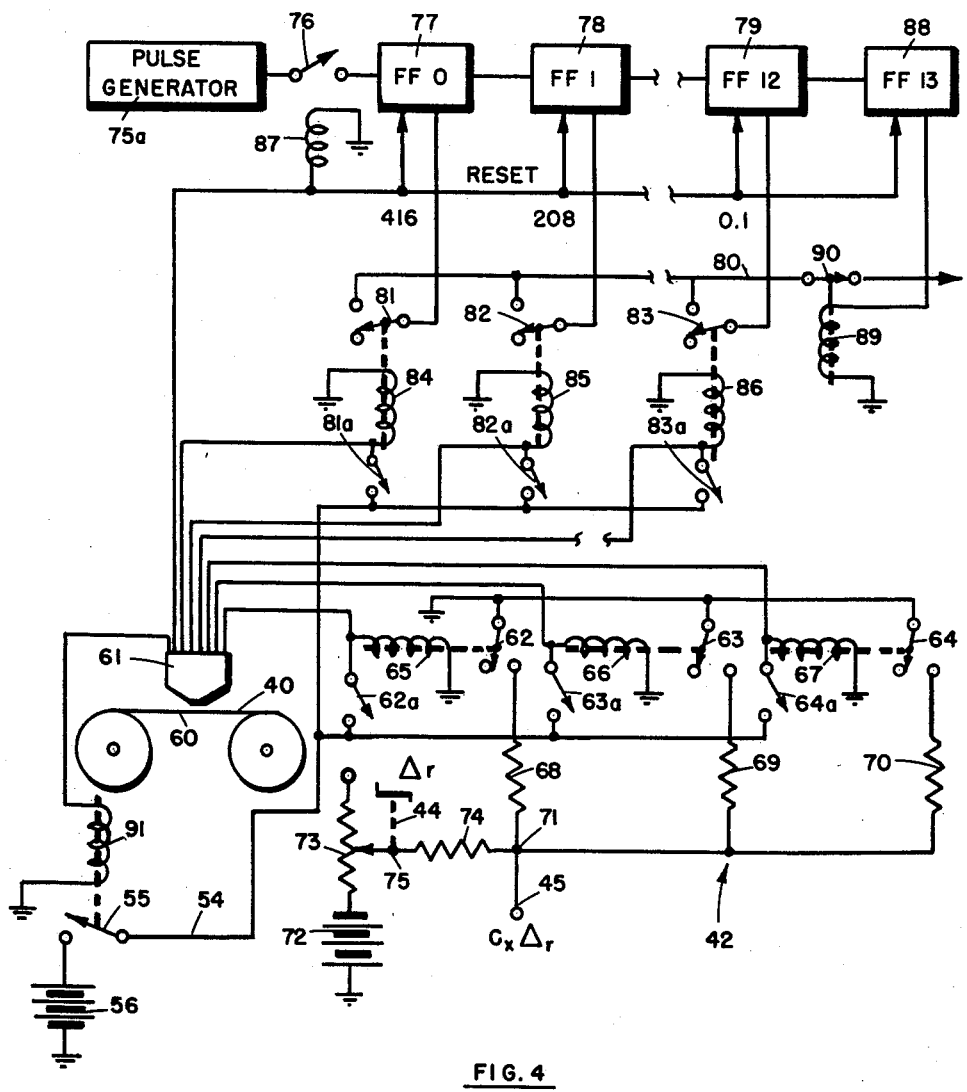
FIG. 4 illustrates certain details of the apparatus of FIG. 3.

It is to be understood that the particular details of the programmer, storage, director and digital to analog conversion networks form no part of this invention since there are many circuits well known to those skilled in the art which may be utilized and connected to perform the functions described above. However, an exemplary mechanization of certain aspects of the computations and operations described in connection with FIG. 3 are shown in further detail in FIG. 4. The programmer 40 is here illustrated as a magnetic tape 60 and a multi-channel tape reader 61. The X axis drive and correction is illustrated in FIG. 4 wherein the X axis direction storage 42 comprises storage relays including a plurality of two position switches 62, 63 and 64 actuated by relay coils 65, 66 and 67 under the control of signals from the tape reader 61. Each storage relay is equipped with a locking contact 62a, 63a, 64a as conventionally applied for storage of information in a relay. Upon energization of one or more of coils 65, 66, 67 from tape reader 61, each energized coil operates to close its self-actuated contacts 62a, 63a, 64a to thus maintain energization of the relays from a source 56 via a common power bus 54 and a normally closed switch 55. The illustrated number of storage relays is exemplary only. Thus, a particular direction number read from the programmer 40 will close a selected group of the storage switches 62, 63 and 64 to thereby energize digitally weighted summing resistors 68, 69 and 70 of the digital to analog conversion network 43. The conversion network is supplied with a voltage at its output terminal 71 from a source 72, potentiometer 73 and resistor 74. The arm 75 of the potentiometer is operated by the shaft 44 in accordance with the value of $\Delta r$ to thereby change the voltage applied to the summing network and achieve multiplication of the analog signal $C_X$ by the signal $\Delta r$. The correction signal $\Delta x$ thus appearing at terminal 71 is applied via lead 45 to the servo 27 of FIG. 3.

The director 24 has as its function the conversion of a digital signal received from the programmer 40 via storage 41 to a number of pulses equal to the stored and programmed position number. Thus since the machine will move a predetermined distance such as, for example, .0005 inch for each director pulse a chosen number of pulses will produce the desired amount of machine traverse. While there are many suitable and well-known arrangements for producing a number of pulses from a digital signal, the arrangement illustrated in FIG. 4 may be conveniently utilized to practice this invention. A pulse generator 75a producing a number of pulses at a known rate such as, for example, 832 pulses per second feeds through switch 76 to a plurality of frequency dividers of which those designated as 77, 78 and 79 are illustrated. The dividers may be thirteen in number (FF0 through FF12 inclusive), for example, each comprising a conventional bistable multivibrator or flip-flop which provides one output pulse for each two input pulses thereto whereby the flip-flops 77, 78 and 79 will produce pulses at the rate of 416, 208 and 0.1 (approximately) pulses per second respectively. Thus, if the pulse generator and flip-flop frequency dividers are turned on for a predetermined time and a selected number of the flip-flop outputs are combined and applied via a common lead 80 to the X comparator 23, the latter will receive a number of pulses as determined by the particular combination of divider flip-flops which is selected. The selection of the divider flip-flops is achieved by the storage relays including switches 81, 82 and 83 coupling respectively the flip-flops 77, 78 and 79 to the common lead 80. The relay switches 81, 82 and 83 are operated by relay coils 84, 85 and 86 which are energized respectively from the digital information stored in the programmer 40 as read out by the read head 61. As in the direction storage relays self-actuated locking contacts 81a, 82a, 83a are provided for maintaining energization of the relays from power bus 54. Thus, a particular number programmed in the tape 60 will operate to close a selected combination of the storage switches 81, 82 and 83 to thereby provide to the X axis comparator 23 via lead 80 a plurality of pulses equal in number to the number digitally stored in the programmer.

It will be readily appreciated that the sequencing of operations and choice of different operating speeds may be controlled by a separate clock timer or programmer which will indicate when reading is to take place from the tape, when the pulse generator is to be stopped, when the flip-flops are to be cleared and when the storage relays are to be cleared. Alternatively, as illustrated, it may be convenient to initiate the operation of the director for each position read out by a separate tape channel which energizes for a suitable period a relay coil 87 to close normally open switch 76, connecting the flip-flops and pulse generator, and simultaneously resets the divider to initial condition. A fourteenth flip-flop (FF13) 88 having an input from the output of the last divider flip-flop 79 may have the output thereof coupled to energize a relay coil 89 to open a normally closed switch 90 upon the termination of the desired director timing period. An additional tape channel may be utilized to momentarily energize a relay 91 at the end of each operation to momentarily open switch 55 and clear the storage relays.

The above-described X axis director channel and direction cosine channel will, of course, be duplicated for each additional axis of the multi-axis machine drive.

While the correction is specifically disclosed as being entered in the gage signals, it will be readily appreciated that entry of the corrections for each axis may be effected, in the alternative, in either the position command signals or in the servo error output from the comparator. The action is equivalent, providing the proper sign of correction and form of signal is used in each case.

Where the system with which this invention is used employs position increments rather than absolute position information, it will be readily appreciated that the direction cosines may be obtained from the position change information. Thus the control may be achieved without requiring additional storage.

Although the invention has been described and illustrated in detail, it is to be clearly understood that the same is by way of illustration only, the spirit and scope of this invention being limited only by the terms of the appended claims.

I claim:

1. In a programmed machine tool control having means for positioning a tool relative to a workpiece, a programmer having stored thereon a position signal indicative of the position of the center of said tool relative to a point on said workpiece to be cut and a direction signal indicative of the direction cosines of the vector between said center and point, means responsive to said programmer for multiplying said direction signal by a signal indicative of chosen tool diameter, and means responsive to said programmer and said multiplying means for operating said positioning means in accordance with both said position and multiplied signals.

2. In a programmed machine tool control having means for positioning a tool relative to a workpiece, a programmer having stored thereon a digital position signal indicative of the position of the center of said tool relative to a point on said workpiece to be cut and a digital direction signal indicative of the direction cosines of the vector between said center and point, a digital to analog converter connected to receive said programmed direction signals, manual means for adjusting the bias of said converter to effect multiplication of said direction signal by a signal indicative of chosen tool diameter, and means responsive to said programmer and said converter for operating said positioning means in accordance with both said position and multiplied signals.

3. In a control system having a drive for positioning a cutting tool relative to a workpiece in accordance with a position signal indicative of the position of the center of said tool relative to a point on said workpiece to be cut, and a programmer storing and supplying said position signal to said drive, the improvement comprising means for storing together with said stored position signal a direction signal indicative of the direction cosines of the line between said center and point, adjustable means responsive to said programmer for multiplying said direction signal by a signal indicative of a chosen tool size to provide a tool size offset signal, and means for combining said offset signal with the position signal supplied to said drive.

4. In a control system having a drive for positioning a cutting tool relative to a workpiece in accordance with a position signal indicative of the position of the center of said tool relative to a point on said workpiece to be cut, and a programmer storing and supplying said position signal to said drive, the improvement comprising means for storing together with said stored position signal a digital direction signal indicative of the direction cosines of the line between said center and point, a digital to analog converter for receiving said direction signal, adjustable means responsive to said converter for multiplying said direction signal by a signal indicative of a chosen tool size to provide a tool size offset signal, and means for combining said offset signal with the position signal supplied to said drive.

5. A control system for positioning a cutter relative to a workpiece in each of three directions defined by a coordinate system having X, Y and Z axes comprising: a programmed drive for each said axis, each said drive comprising a motor connected to move said cutter relative to said workpiece, a programmer storing a position signal indicative of a desired position of the center of said cutter relative to a point on said workpiece to be cut, a director responsive to said stored position signal for generating a command signal, gage means for generating a gage signal indicative of the actual position of said cutter, and a comparator responsive to said director and gage for transmitting to said motor a drive signal in accordance with the difference between said command and gage signals; and a cutter diameter corrector for each axis, each said corrector comprising means in said programmer for storing a direction signal with said position signals and indicative of a direction cosine of a line between said desired position and said point, means for multiplying said direction signals by a signal indicative of a chosen cutter size, a correction circuit interposed between the gage and comparator of the corresponding axis drive, and means for transmitting said multiplied signals to said correction circuit.

6. A control system for positioning a cutter relative to a workpiece in each of three directions defined by a coordinate system having X, Y and Z axes comprising: a programmed drive for each said axis, each said drive comprising a motor connected to move said cutter relative to said workpiece, a programmer storing a position signal indicative of a desired position of the center of said cutter relative to a point on said workpiece to be cut, a director responsive to said stored position signal for generating a command signal, gage means for generating a gage signal indicative of the actual position of said cutter, and a comparator responsive to said director and gage for transmitting to said motor a drive signal in accordance with the difference between said command and gage signals; and a cutter diameter corrector for each axis, each said corrector comprising means in said programmer storing a digital direction signal with said position signals and indicative of a direction cosine of a line between said desired position and said point, a biased digital to analog converter connected to receive said direction signal, means for selectively varying the bias of said converter in accordance with a chosen cutter size, a correction circuit interposed between the gage and comparator of the corresponding axis drive, and means for transmitting the output of said converter to said correction circuit.

7. In a machine tool control: storage means digitally storing first and second numbers respectively indicative of the position of the center of a nominal size cutter relative to a point to be cut and of the direction cosine of the line between said center and said point; a digital servo including storage readout means for said first number, a gage responsive to machine position, a comparator having inputs from said gage and said readout means and having an output indicative of the difference between said inputs, and a machine driving motor responsive to said comparator output; second readout means for said second number; a digital to analog conversion network having an output and including a resistive summing network and a source of potential therefor; a correction circuit interposed between said gage and comparator and having an output to said comparator, a first input from said gage and a second input from said conversion network output; and means for adjusting said potential source in accordance with the difference between said nominal size and a selected cutter size.

References Cited in the file of this patent

UNITED STATES PATENTS

| | | |
|---|---|---|
| 2,839,711 | Tripp | June 17, 1958 |
| 2,843,811 | Tripp | July 15, 1958 |
| 2,917,693 | Cail | Dec. 15, 1959 |

FOREIGN PATENTS

| | | |
|---|---|---|
| 1,114,501 | France | Apr. 13, 1956 |
| 778,060 | Great Britain | July 3, 1957 |

OTHER REFERENCES

Proceedings of the EIA Symposium of Numerical Control Systems for Machine Tools, September 17, 1957, pages 37–41.